UNITED STATES PATENT OFFICE.

BIRGER FJELD HALVORSEN, OF CHRISTIANIA, NORWAY, ASSIGNOR TO NORSK HYDRO-ELEKTRISK KVAELSTOFAKTIESELSKAB, OF CHRISTIANIA, NORWAY.

METHOD OF ABSORBING DILUTE NITROUS GASES.

948,726.           Specification of Letters Patent.      Patented Feb. 8, 1910.

No Drawing.            Application filed July 11, 1907. Serial No. 383,305.

*To all whom it may concern:*

Be it known that I, BIRGER FJELD HALVORSEN, a subject of the King of Norway, residing at Christiania, Norway, have invented certain new and useful Improvements in the Method of Absorbing Dilute Nitrous Gases; and I do hereby declare the following to be a full, clear, and exact description of the invention, such as will enable others skilled in the art to which it appertains to make and use the same.

By the combustion of nitrogen into nitric oxids, for example, in an electric, high tension arc, the hot nitrogen compounds produced are always highly diluted with air. In the utilization of such compounds this great dilution causes considerable difficulty, as, in consequence thereof, the absorbing agents, fluids or gases generally employed, prove insufficient for complete absorption.

The present invention has for its object the use of solid substances as absorbing agents, and thereby to obtain a considerably better absorption. The solid substances should either be bases, as for instance lime, or they should be salts of acids whose acid radicals are easily replaced by nitric acid (as carbonates, chlorids and phosphates). The absorbing agents are suitably employed in a finely pulverized condition in order to obtain the absorption of a large amount of nitrogen, and they are most suitably exposed to the gases while the absorbents are kept in motion, either in any well-known form of rotating drum or by suitably stirring them. In such a method of absorption when using dry slaked or finely pulverized unslaked lime an exceedingly far more powerful absorption is obtained than would be possible by the methods of absorbing now in use. An equally good result is obtained with soda or caustic soda. Somewhat less efficient are chlorid of sodium and chlorid of potassium, but, if these latter substances are utilized, valuable by-products are obtained. Such is also the case when using apatite and Thomas phosphate.

In addition to the improved absorption, the method affords a number of other technical advantages, especially with regard to the simplification of machinery and labor in the factories.

I claim—

1. The method of absorbing dilute nitrous gases, which comprises conducting said gases while hot into contact with dry solids capable of reacting with the said nitrous gas.

2. The method of absorbing hot, dilute nitrous gases, which comprises conducting said gases while hot into finely divided dry solids capable of reacting with said nitrous gases.

3. The method of absorbing hot dilute nitrous gases resulting from the oxidation of nitrogen in electric furnaces, which comprises conducting said gases directly from the furnace into finely divided dry solids whose metal radicals are capable of combining with the nitrous gases, and maintaining the agitation of said solids during the reaction.

4. The method of absorbing hot nitrous gases, which comprises conducting said gases while hot into finely divided dry lime.

5. The method of absorbing hot, dilute nitrous gases resulting from the oxidation of nitrogen by the electric arc, which comprises conducting the gases while hot into finely divided dry lime during the agitation of the latter, thereby producing calcium nitrate.

In testimony that I claim the foregoing as my invention, I have signed my name in presence of two subscribing witnesses.

BIRGER FJELD HALVORSEN.

Witnesses:
  MICHAEL ALGER,
  HENRY BORDEWICH.